(12) United States Patent
Thielman

(10) Patent No.: US 9,629,501 B2
(45) Date of Patent: Apr. 25, 2017

(54) SELF-OILING SKILLET

(71) Applicant: Joseph-Gerhard S. Thielman, Fredericksburg, VA (US)

(72) Inventor: Joseph-Gerhard S. Thielman, Fredericksburg, VA (US)

( * ) Notice: Subject to any disclaimer, the term of this patent is extended or adjusted under 35 U.S.C. 154(b) by 0 days.

(21) Appl. No.: 14/447,592

(22) Filed: Jul. 30, 2014

(65) Prior Publication Data

US 2016/0029843 A1    Feb. 4, 2016

(51) Int. Cl.
*B65D 35/28* (2006.01)
*A47J 37/10* (2006.01)
*A47J 45/06* (2006.01)

(52) U.S. Cl.
CPC ........... *A47J 37/108* (2013.01); *A47J 45/061* (2013.01)

(58) Field of Classification Search
CPC ............................... A47J 37/108; B65D 35/28
USPC ........................................................... 222/95
See application file for complete search history.

(56) References Cited

U.S. PATENT DOCUMENTS

| | | | | | |
|---|---|---|---|---|---|
| 1,209,551 | A | * | 12/1916 | Burns | 126/380.1 |
| 2,204,467 | A | * | 6/1940 | Beatson | 126/380.1 |
| 5,323,932 | A | * | 6/1994 | Bauman | 222/96 |
| 5,701,807 | A | * | 12/1997 | Park | 99/422 |
| 5,943,947 | A | | 8/1999 | Adams | 99/341 |
| 2005/0247736 | A1 | * | 11/2005 | Mahurin | 222/213 |
| 2007/0256683 | A1 | * | 11/2007 | Zimmerman | 126/369 |
| 2008/0210693 | A1 | * | 9/2008 | Hoffman et al. | 220/573.2 |

* cited by examiner

*Primary Examiner* — Patrick M Buechner
*Assistant Examiner* — Jeremy W Carroll

(57) ABSTRACT

A mechanism is provided for dispensing oil into a cooking skillet having a sauce basin and a handle. The mechanism includes a bladder for containing the oil, and a trigger, both disposed within the handle. The bladder includes a tube that extends into the sauce basin to dispense oil therein. The trigger squeezes the bladder to inject the oil into the tube in response to grasping the handle by a hand. The bladder further includes a fill spout to add the oil into the bladder. Additionally, a self-oiling skillet for cooking is provided, including a sauce basin for cooking food on a stove, a handle attached to the sauce basin for enabling a hand to grasp, and the mechanism for dispensing oil into the sauce basin.

6 Claims, 3 Drawing Sheets

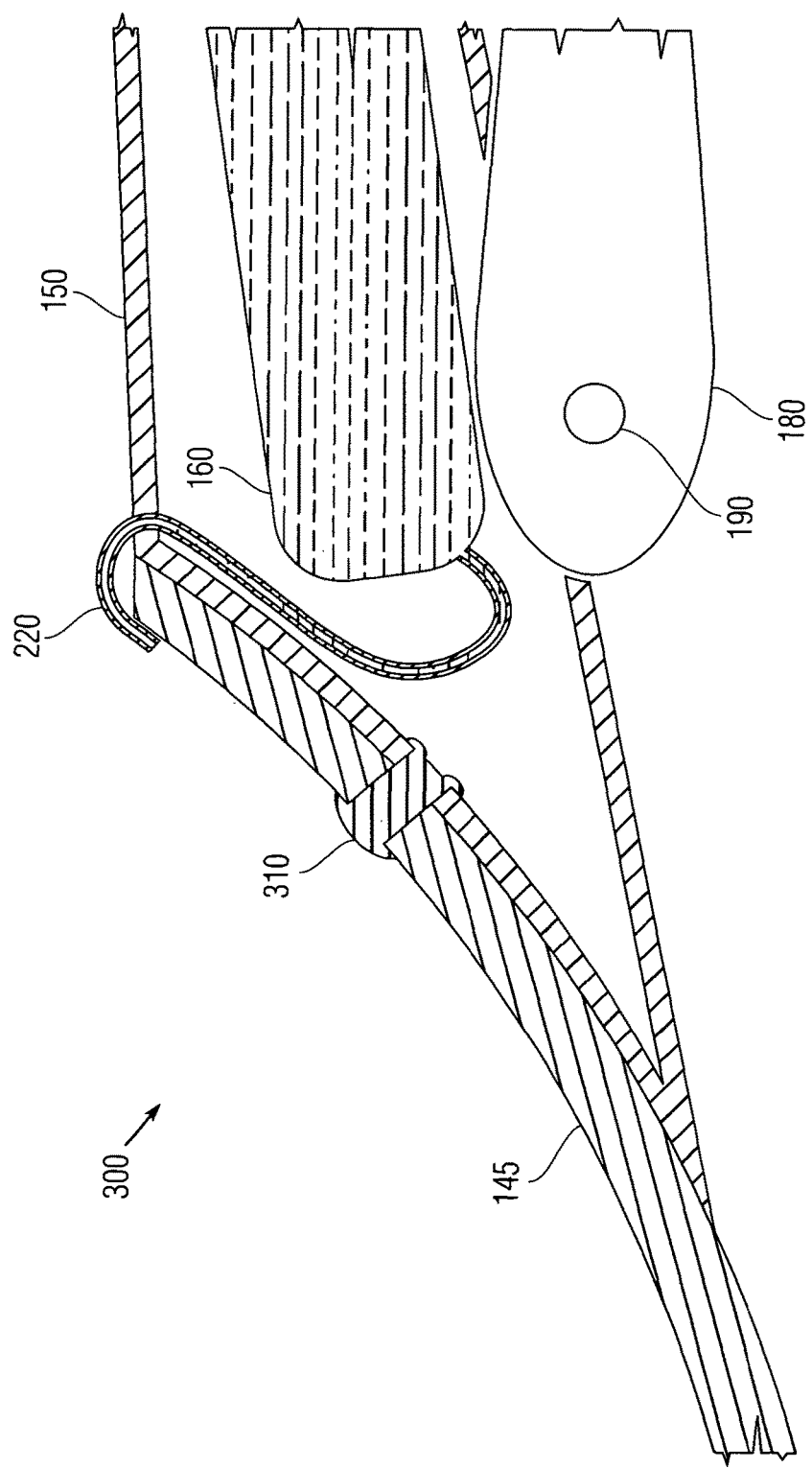

SELF-OILING SKILLET

BACKGROUND

The invention relates generally to stove-cooking skillets. In particular, the invention relates to kitchen skillets that dispense cooking oil to the heating surface.

Chefs and cooks operate a variety of pans for frying and other cooking operations. In many instances, cooking oil must be added to the sauce basin of the pan to reduce adhesion of the cauterized food onto the cooking surface of the pan. Typically, depositing oil into the pan must be accomplished separately from the cooking process.

SUMMARY

Conventional skillets and sauté pans yield disadvantages addressed by various exemplary embodiments of the present invention. In particular, various embodiments provide a mechanism for dispensing oil into a cooking skillet having a sauce basin and a handle. The mechanism includes a bladder for containing the oil, and a trigger, both disposed within the handle. The bladder includes a tube that extends into the sauce basin to dispense oil therein. The trigger squeezes the bladder to inject the oil into the tube in response to grasping the handle by a hand. The bladder further includes a fill spout to add the oil into the bladder.

In alternate embodiments, a self-oiling skillet for cooking is provided. The exemplary skillet includes a sauce basin for cooking food on a stove, a handle attached to the sauce basin for enabling a hand to grasp, and the mechanism for dispensing oil into the sauce basin.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 3 is an elevation detail cross-section view of the oil dispensing mechanism.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be derived, and various changes may be made without departing from the spirit or scope of the present invention. The following detailed description is, therefore, not to be taken in a limiting sense, and the scope of the present invention is defined only by the appended claims.

Figure 1:
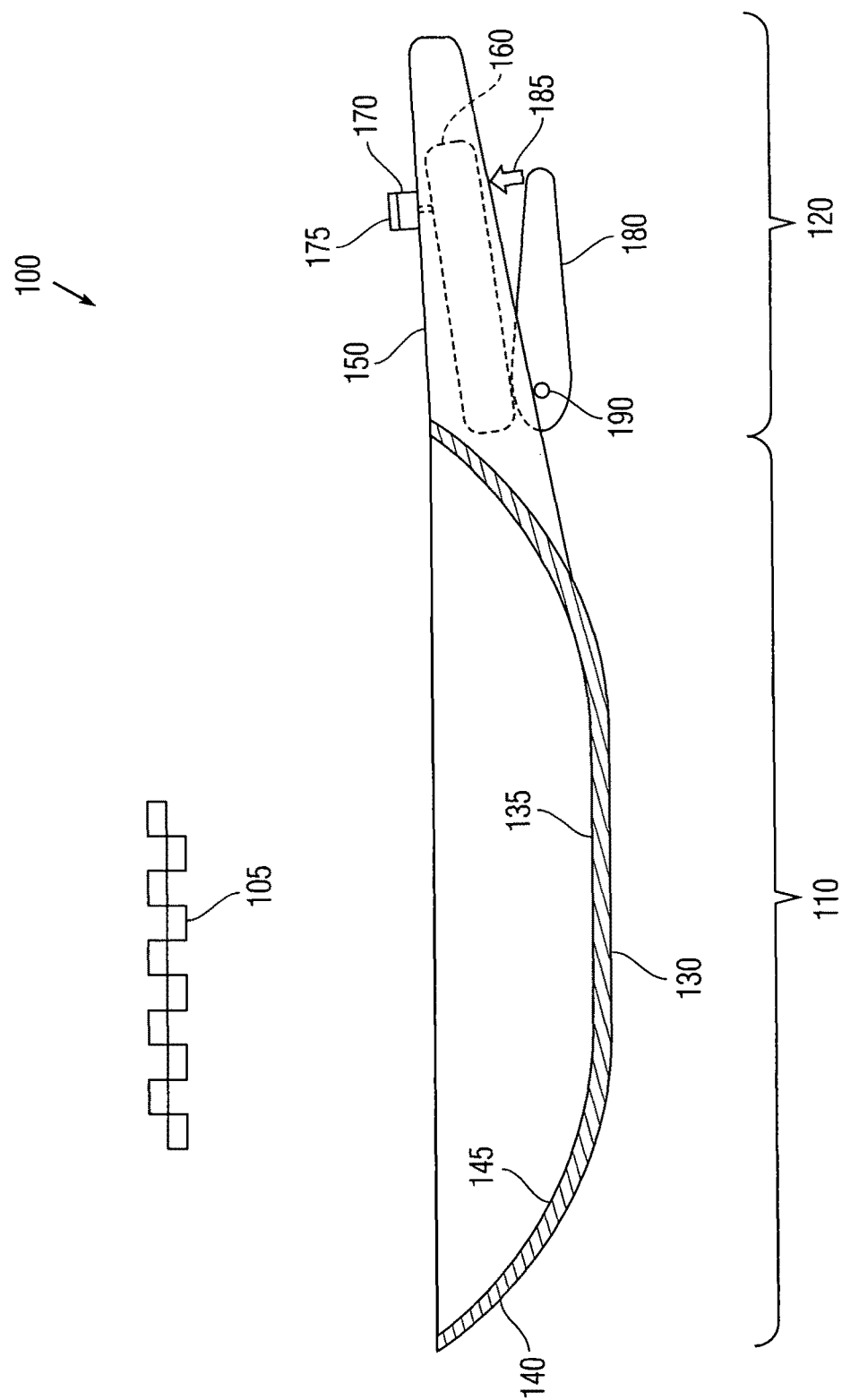
FIG. 1 is an elevation view of an exemplary skillet with an oil dispensing mechanism.

FIG. 1 shows an elevation view 100 with a ten-centimeter (10 cm) scale 105 of an exemplary skillet that includes a sauce basin 110 and a handle section 120. Artisans of ordinary skill will recognize that the principles described herein can also be applied to other types of pans without departing from the inventive scope. The sauce basin 110 includes a base 130 with a bottom cooking surface 135 and an annular sidewall 140 with an auxiliary cooking surface 145. The base 130 receives the heat energy transferred from the stove burner.

The handle section 120 includes a handle grip 150, as well as exemplary components for dispensing cooking oil to the cooking surfaces 145 and 135. The cooking oil can constitute vegetable oil, corn oil and the like. The handle 150 includes a flexible bladder 160 that contains the oil, a fill spout 170 with sealing cap 175, a trigger 180. When a chef's hand envelops the grip 150, the fingers press the trigger 180, which pivots towards the bladder 160 in direction arrow 185 at a hinge 190. Components disposed within the grip 150 are presented in dash line. By such action, the trigger 180 squeezes the bladder 160 so as to eject the oil into the sauce basin 110.

Figure 2:
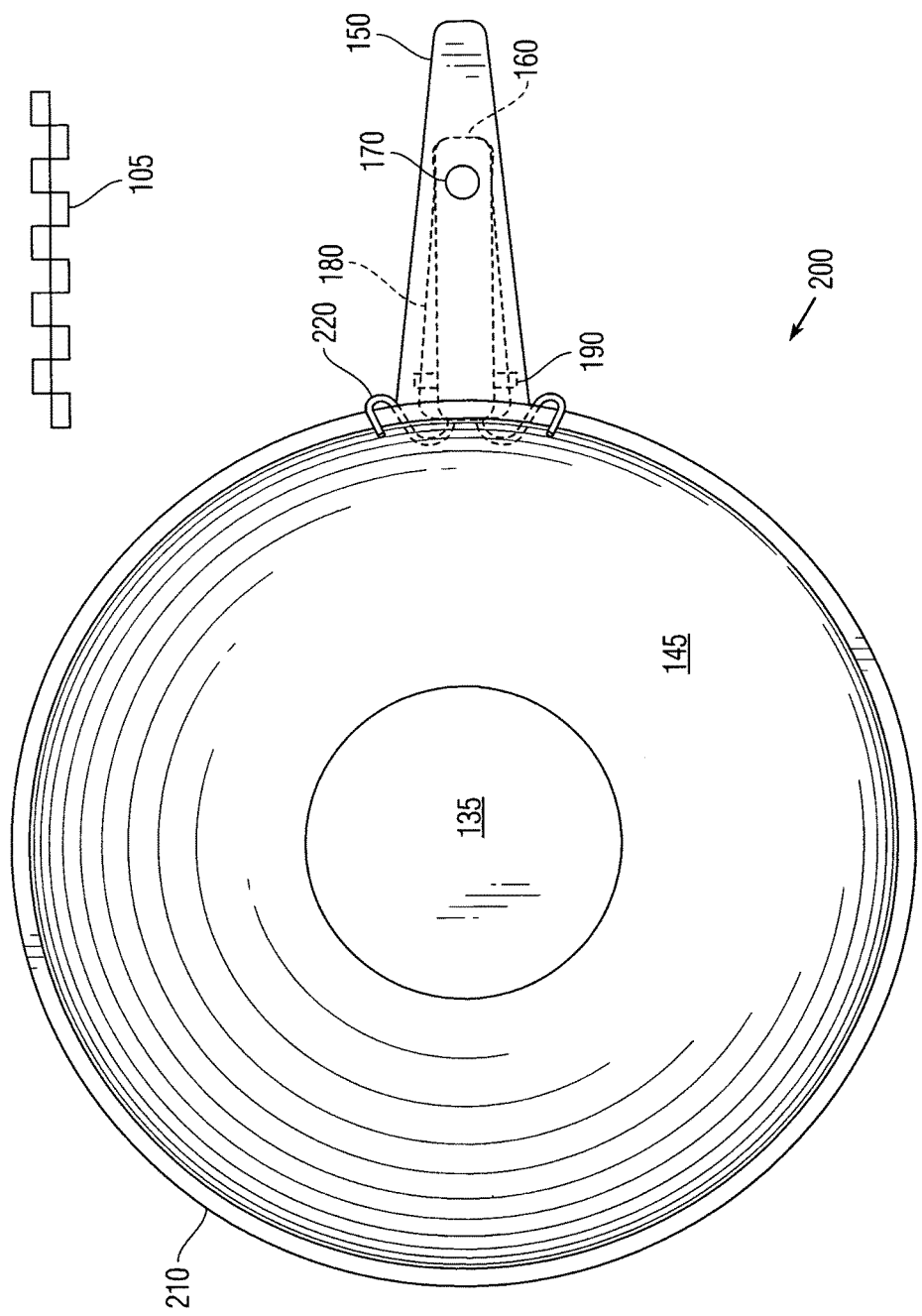
FIG. 2 is a plan view of the exemplary skillet with the oil dispensing mechanism.

FIG. 2 shows a plan view 200 of the exemplary skillet with an annular rim 210. A pair of tubes 220 extend from the bladder 160 and over the rim 210 to dispense oil onto the auxiliary cooking surface 145 from which the oil falls into the bottom cooking surface 135. The tubes 220 can be secured to the rim 210 by clamps or other similar attachment mechanisms.

The fill spout 170 provides convenient access to the bladder 160 for replenishing the oil. Artisans of ordinary skill will recognize that the fill spout 170 can be moved to be more distal from the sauce pan 110 than featured in the drawings. The hinge 190 constitutes a shaft suspended from flanges extending from the grip 150. Depending on the gap distance between the flanges, the trigger 180 may be wider or narrower than illustrated in the extant drawings.

FIG. 3 shows an elevation detail cross-section view 300 of the oil-dispensing mechanism. At least one rivet 310 can be used to secure the handle section 120 to the sauce basin 110 along the annular sidewall 140. The tube 220 extends from approximately the bladder 160 and over the rim 210 to dispense the oil from the bladder 160 to the auxiliary cooking surface 145. The bladder 160 can be composed from polyamide or similar material. The tubes 220 can be composed of Norprene® A-60-F or Versilic® PX-50 from Total Plastics Inc. with an inner diameter of 0.16 cm and an outer diameter of 0.48 cm.

The exemplary rim 210 has an inner diameter of 26 cm, the diameter of the bottom cooking surface 145 is 8.5 cm, and the grip 150 extends 7.5 cm from the rim 210. The bladder 160 can be maintained in position by a clamp ring around the grip 150 or other appropriate mechanism. The quantity of oil used per cooking cycle is estimated as one US tablespoon (Tbsp.) equivalent to 14.8 mL or ½ US fluid ounce. This amount can be contained within the volume of a bladder 160 having a length of 8 cm and a diameter of 1.6 cm. A larger bladder 160 would contain more oil, sufficient for multiple cooking applications prior to refilling.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A mechanism for dispensing oil into a cooking skillet having a sauce basin and a handle attached thereto, said mechanism operated by a person having a hand and comprising:

a bladder for containing the oil, said bladder being disposed within the handle and including a tube that extends from the bladder, external the handle, and into the sauce basin to dispense the oil therein; and a trigger disposed within the handle, wherein said trigger squeezes said bladder to inject the oil through said tube into the basin in response to grasping the handle by the hand.

2. The mechanism according to claim 1, wherein said trigger pivots along a hinge to engage said bladder.

3. The mechanism according to claim 1, wherein said bladder further includes a fill spout to add more oil into said bladder.

4. A self-oiling skillet for cooking by a person having a hand, said skillet comprising:

a sauce basin for cooking food on a stove;

a handle attached to said sauce basin for enabling the hand to grasp;

a bladder for containing oil, said bladder being disposed within said handle and including a tube that extends from the bladder, external the handle, and into said sauce basin to dispense said oil therein; and a trigger disposed within said handle, wherein said trigger squeezes said bladder to inject said oil through said tube into the basin in response to grasping said handle by the hand.

5. The mechanism according to claim 4, wherein said trigger pivots along a hinge to engage said bladder.

6. The mechanism according to claim 4, wherein said bladder further includes a fill spout to add more oil into said bladder.

* * * * *